US008892939B2

(12) United States Patent
Belhadj et al.

(10) Patent No.: US 8,892,939 B2
(45) Date of Patent: Nov. 18, 2014

(54) OPTIMIZING A RAID VOLUME

(71) Applicant: Hewlett-Packard Development Company, L.P., Houston, TX (US)

(72) Inventors: Mohamed Belhadj, Eagle, ID (US); Charles Franklin Randall, Boulder, CO (US); Douglas James Cameron, Bellevue, WA (US); Siamak Nazari, Mountain View, CA (US); Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 124 days.

(21) Appl. No.: 13/683,765

(22) Filed: Nov. 21, 2012

(65) Prior Publication Data

US 2014/0143594 A1 May 22, 2014

(51) Int. Cl.
*G06F 11/20* (2006.01)
(52) U.S. Cl.
CPC .................................. *G06F 11/2094* (2013.01)
USPC ....................................................... 714/6.22
(58) Field of Classification Search
CPC ............ G06F 11/2094; G06F 11/1092; G06F 2211/1059; G06F 11/1461; G06F 11/008; G06F 2211/1088
See application file for complete search history.

(56) References Cited

U.S. PATENT DOCUMENTS

| 5,278,838 | A | 1/1994 | Ng et al. | |
| 6,516,425 | B1 | 2/2003 | Belhadj et al. | |
| 7,137,038 | B2 * | 11/2006 | New et al. | 714/42 |
| 7,139,931 | B2 | 11/2006 | Horn | |
| 7,213,165 | B2 | 5/2007 | Umberger et al. | |
| 8,032,782 | B2 * | 10/2011 | He et al. | 714/6.1 |
| 2005/0081086 | A1 * | 4/2005 | Williams | 714/5 |
| 2008/0256427 | A1 * | 10/2008 | He et al. | 714/801 |
| 2010/0115335 | A1 * | 5/2010 | Wylie et al. | 714/25 |

OTHER PUBLICATIONS

Liu, J. et al.; Modeling the Impact of Disk Scrubbing on Storage System; Journal of Computers, vol. 5; Issue: 11; Nov. 2010; pp. 1629-1637.

* cited by examiner

*Primary Examiner* — Nadeem Iqbal

(57) ABSTRACT

Optimization of a RAID volume is described. In an example, a method of optimizing a redundant array of independent disks (RAID) volume includes: identifying a RAID level used for a plurality of disks in the RAID volume; defining a relation among rebuild rate, scrub rate, and annualized data loss event rate (ADLER) for the RAID volume using constant values and the RAID level; selecting a value for the ADLER; applying a policy to the relation to choose a value for one of the rebuild rate or the scrub rate; and determining a value for the other of the rebuild rate or the scrub rate from the relation using the value of the rebuild rate or the scrub rate as determined from the policy.

15 Claims, 5 Drawing Sheets

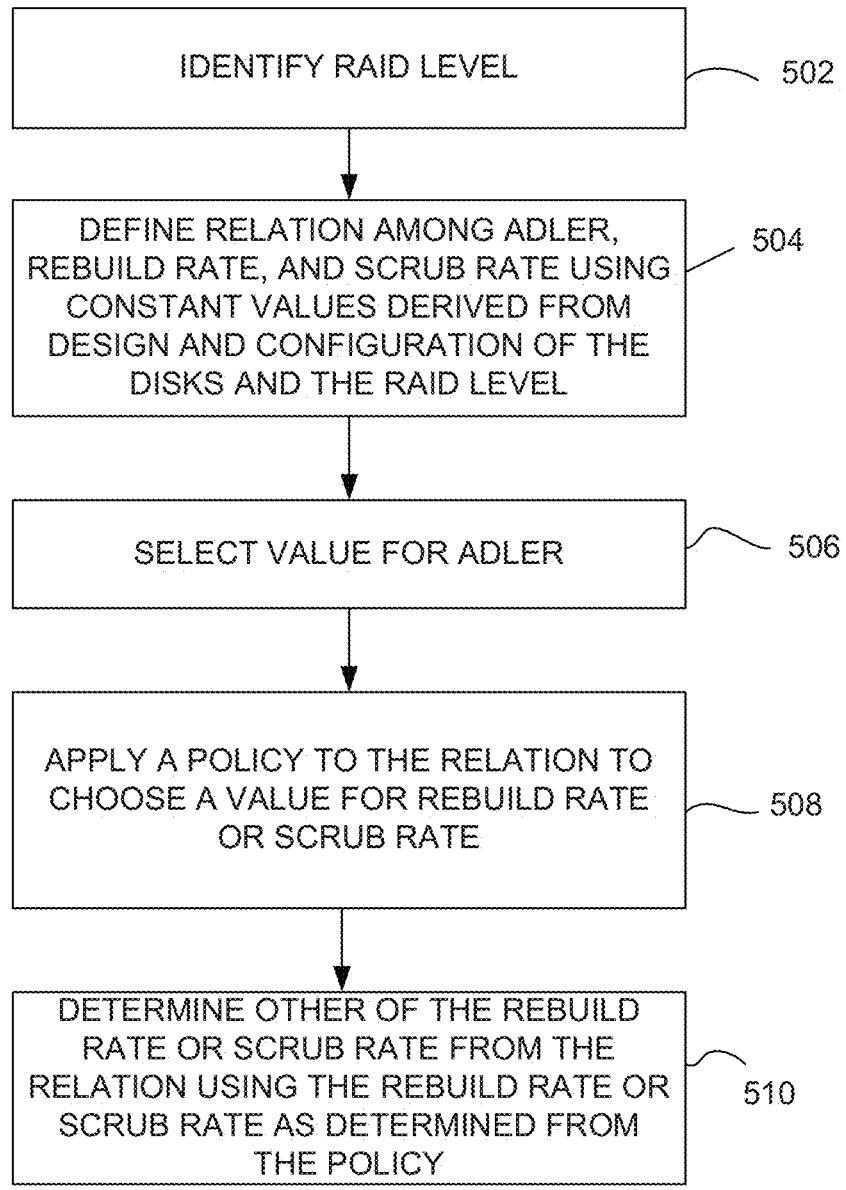
FIG. 5    500

OPTIMIZING A RAID VOLUME

BACKGROUND

In some computer systems, multiple physical disk drives can be grouped and accessed as a single logical volume. The logical volume is often implemented using a RAID (Redundant Array of Independent Disks) technique. RAID is a storage technology that combines multiple disk drive components into a logical unit. Data is distributed across the physical disk drives using a particular configuration or "RAID level." Different RAID levels can be employed, depending on what level of redundancy (e.g., fault tolerance) and performance is required. When data redundancy is lost in a RAID system due to disk failure(s), the disk array must recover redundancy before additional failures occur to avoid data loss.

BRIEF DESCRIPTION OF THE DRAWINGS

Some embodiments of the invention are described with respect to the following figures:

FIG. 5 is a flow diagram depicting a method of optimizing a RAID volume according to an example implementation.

DETAILED DESCRIPTION

Figure 1:
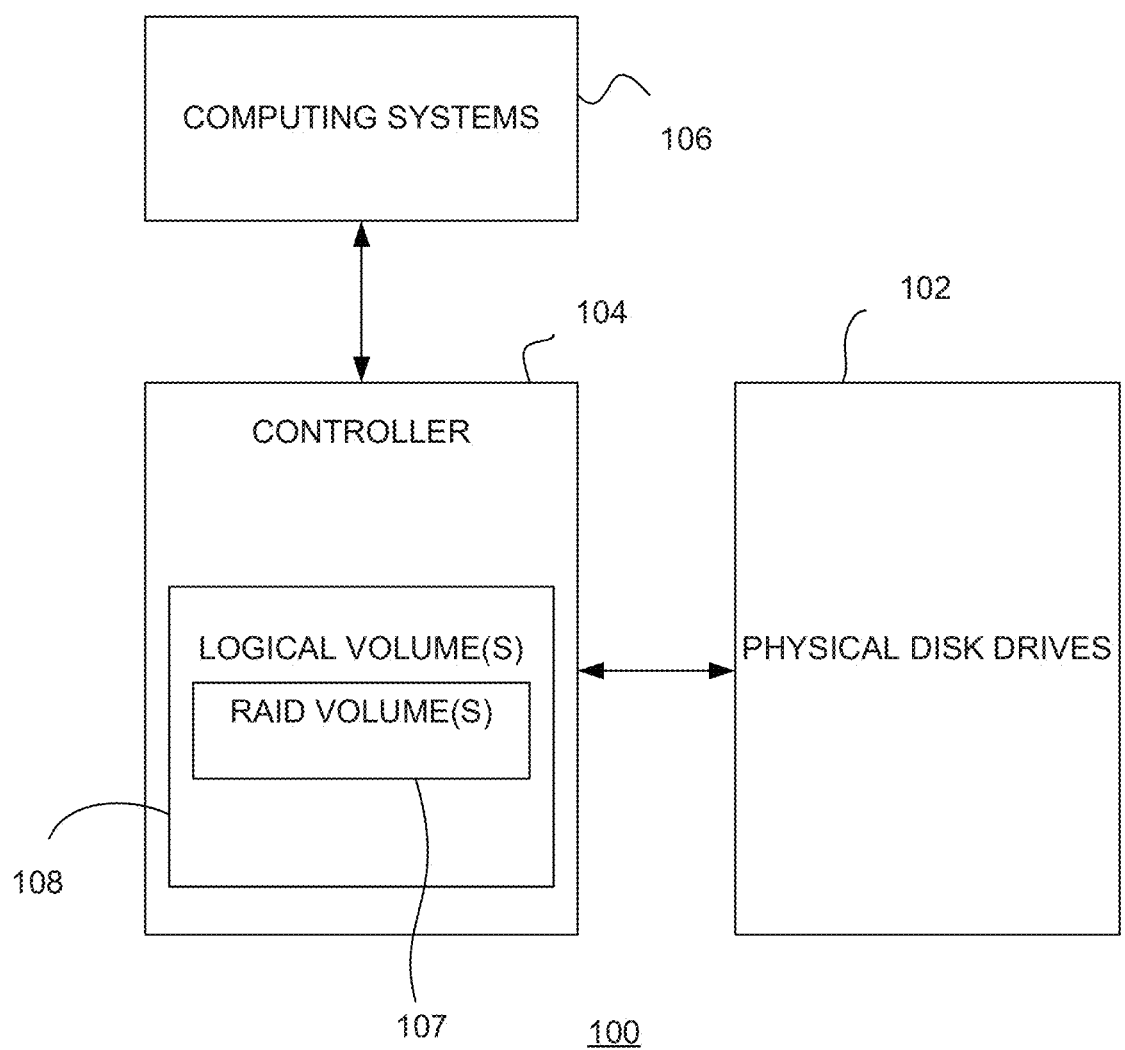
FIG. 1 is a block diagram showing a storage system according to an example implementation.

FIG. 1 is a block diagram showing a storage system 100 according to an example implementation. The storage system 100 includes a plurality of physical disk drives 102 and a controller 104. Various computing systems 106 can communicate with the controller 104 to write and read data from the physical disk drives 102. The controller 104 organizes the physical disk drives 102 to provide logical volume(s) 108, which is/are presented to the computing systems 106. That is, the computing systems 106 do not directly access the individual physical disk drives 102, but rather the logical volume(s) 108 presented and controlled by the controller 104. The controller 104 can be part of a larger system, such as a server (not shown).

In an example, one or more of the logical volume(s) 108 comprises at least one RAID (Redundant Array of Independent Disks) volume (RAID volume(s) 107). That is, multiple ones of the physical disk drives 102 are combined to form RAID set(s) 107 such that the data is distributed across the selected physical disk drives 102 using a particular scheme or "RAID level." Examples of RAID levels include RAID-0 (striping data across multiple disk drives), RAID-1 (mirroring data across multiple disk drives), RAID-5 (block-level striping with parity). Other examples of RAID levels include RAID-2, RAID-3, RAID-4, RAID-6, RAID-1MM (double mirror), RAID-50, RAID-60, and the like RAID set(s) are combined to form a logical volume 108. Each of the logical volume(s) 108 can include a fault-tolerant configuration of RAID set(s) (e.g., RAID-1 or RAID-5 set(s)), or a non-fault-tolerant configuration of RAID set(s) (e.g., RAID-0 set(s)). The controller 104 can control rebuild and scrub rates of RAID set(s) in order to meet a specified Annualized Data Loss Event Rate (ADLER) goal with a minimum of disruption to performance. ADLER provides a measure of data loss rate on an annualized basis. A similar metric is the Mean Time To Data Loss (MTTDL). While ADLER is described herein in various examples, it is to be understood that the ADLER can be converted to other known metrics, such as MTTDL.

Figure 2:
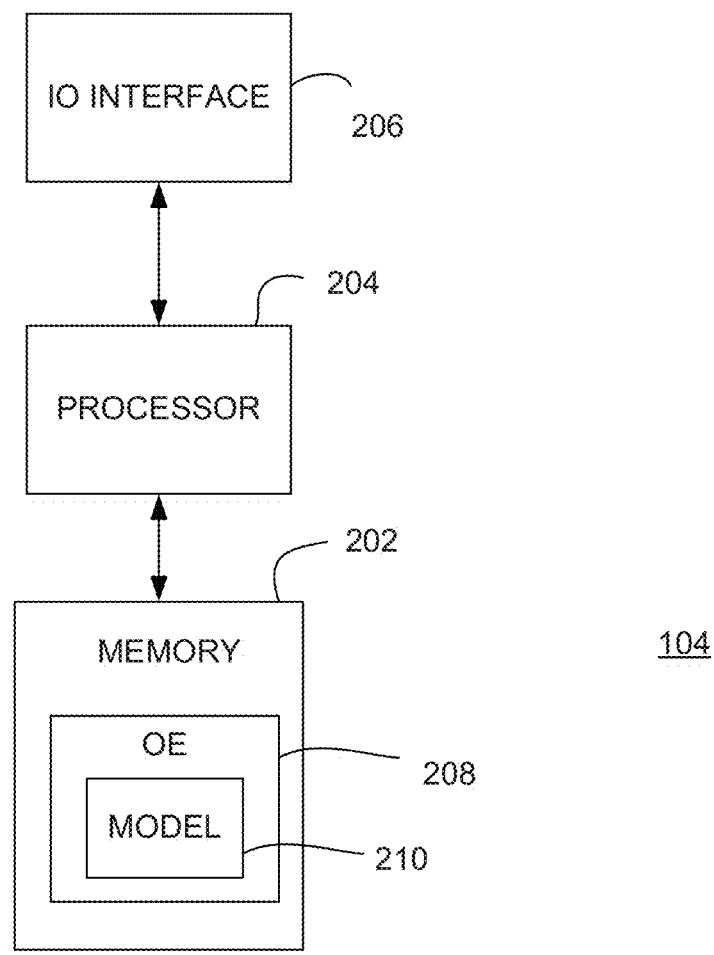
FIG. 2 is a block diagram of a controller in the storage system of FIG. 1 according to an example implementation.

FIG. 2 is a block diagram of the controller 104 according to an example implementation. The controller 104 includes a memory 202, a processor 204, and an input/output (IO) interface 206. The processor 204 can include any type of microprocessor, microcontroller, or the like known in the art. The memory 202 can include random access memory, read only memory, cache memory, non-volatile memories such a flash, magnetic read/write memory, or the like or any combination of such memory devices. The IO interface 206 can provide busses, bridges, and the like to facilitate communication with the components of the controller 104.

The memory 202 can store code executable by the processor 204 to provide an operating environment (OE) 208 (e.g., firmware). A user can interact with the OE 208 to configure the controller 104 and the attached physical disk drives 102. For example, a user can interact with the OE 208 to select particular disk drives and organize them into RAID sets of a particular type (e.g., particular RAID level), and RAID sets into logical volumes. Alternatively, an external system (e.g., one of the computing systems 106) can interact with the OE 208 to configure the controller 104 and the attached physical drives 102 automatically without user interaction. The OE 208 can also employ a model 210 to control rebuild and scrub rates of RAID set(s), as described below. The OE 208 can use the model 210 to determine optimal rebuild and scrub rates for any given RAID volume, and implement the rebuild and scrub processes according to the selected rates.

Rebuild and scrub rates for a RAID volume can be fixed at a constant value or subject to limits based on other activity in the array. Such techniques can limit ADLER to a predictable array-specific upper bound. Such techniques, however, do not optimize the tradeoff between minimum ADLER and maximum performance. In an example implementation, the controller 104 applies a mathematical model to the rebuild and scrub rate optimization problem. The model includes various parameters that reflect array algorithms, configuration settings, and disk failure characteristics. Rebuild and scrub rates can then be optimized accordingly.

Figure 3:
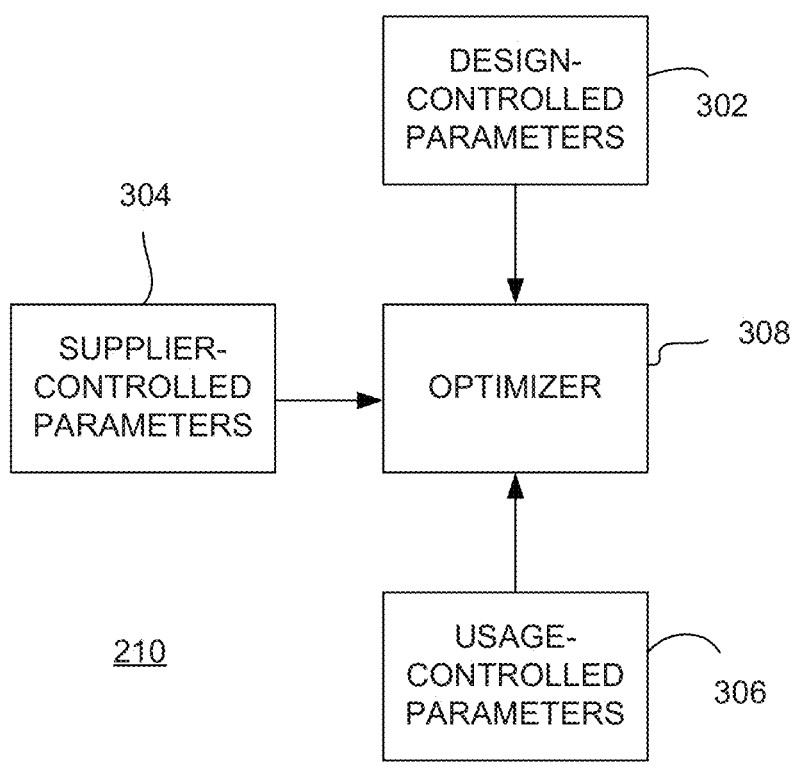
FIG. 3 is a block diagram of a model for optimizing rebuild and scrub rates for RAID volume according to an example implementation.

FIG. 3 is a block diagram depicting the model 210 according to an example implementation. The model 210 includes design-controlled parameters 302, supplier-controlled parameters 304, and usage-controlled parameters 306 as parametric input to an optimizer 308. In an example, the design-controlled variables 302 include RAID geometry (K), RAID fault domain size (G), rebuild rate (ER), scrub rate (SR), and correlated failures factor ($\alpha$). In an example, the supplier-controlled variables 304 include disk failure rate (e.g., mean time between failure (MTBF)) and unrecoverable read error specification (Pseg). In an example, the usage-controller variables 306 include disk type (class), disk capacity (C), number of disks (N). RAID level (e.g., 1, 5, 6, 1MM), load (Ld), and type of load (rw).

For the design-controlled variables 302, the parameters can be defined as follows:
K: RAID geometry—can be the number of disks in a RAID stripe, including both data and redundancy information.
G: RAID fault domain—can be the number of disks that are codependent on each other due to RAID stripes being laid out across them.

ER: Rebuild rate—can be the rate at which data or redundancy information that is missing due to a failure is regenerated so as to return the disk array to a fully redundant state.

SR: Scrub rate—can be the rate at which data is read in the background during normal operation so as to detect defects in the media. Scrubbing a RAID volume is important because it decreases the chance that defects will exist when a disk failure occurs, mitigating a major source of data loss.

α: Correlated failures factor—can be a measure of the ratio of disk failure rate that occurs shortly after a first disk failure to the first disk failure rate. Correlated failures factor can be empirically determined.

For the supplier-controlled variables 304, the parameters can be defined as follows:

MTBF: Mean Time Between Failure—can be a measure of the inverse of the disk failure rate (average rate of failures that render data on the disk inaccessible).

Pseg: Unrecoverable read error specification—can be the average chance per disk segment of occurrence of unrecoverable segments on disks that have not failed. A segment is part of a RAID stripe that resides on a single disk drive.

For the usage-controlled variables 306, the parameters can be defined as follows:

C: disk capacity—can be the size of a disk (in gigabytes (GB) for the model 210).

N: The number of disks—can be the total number of disks in the RAID array.

RAID level (1, 5, 1MM, 6): determines the specific relationship between data segments and redundancy segments, including the number of redundancy segments per data segment.

Ld: The load—can be a measure of server generated load per disk (e.g., input/output operations per second (IOPs)).

rw: The type of load—can be the ratio of write operations to the sum of read operations and write operations.

The optimizer 308 relates the ADLER, rebuild rate, and scrub rate using constant values derived from the design and configuration of the disks and RAID volume based on the parameters described above. The optimizer 308 determines optimal values for rebuild and scrub rates for a given RAID volume.

The following derivation of the model 210 assumes a single type and capacity of disk drive. Only one RAID level is modeled at a time, and full capacity utilization is assumed. These assumptions can be relaxed by computing the model on subsets of the capacity in the array and deriving optimal scrub rate and rebuild rate for those subsets.

Derivation of the model 210 can begin with a generic description of ADLER for example RAID levels. The notation P(<x>) is read as "the probability of event <x>". The following combinations of probabilities represent paths leading to data loss, where "URE" means unrecoverable read error(s):

RAID1 ADLER (Events/Year per array)~[P(any disk fails within any RAID1 volume in the array per year)*Many disk within the degraded RAID1 volume fails during rebuild period)+P(encountering URE on any disk within the degraded RAID1 volume during rebuild)]

RAID5 ADLER (Events/Year per array)≃P(any disk fails within any RAID5 volume in the array per year)*[P(any disk within the degraded RAID5 volume fails during rebuild period)+P(encountering URE on any disk within the degraded RAID5 volume during rebuild)]

RAID1MM ADLER (Events/Year per array)~P(any disk fails within any RAID1MM volume in the array per year)*P(a second disk within the degraded RAID1MM volume fails during rebuild period)*[P(a third disk within the degraded RAID1MM volume fails during rebuild period)+P(encountering URE on a third disk within the degraded RAID1MM volume during rebuild)]

RAID6 ADLER (Events/Year per array)~P(any disk fails within any RAID6 volume in the array per year)*P(a second disk within the degraded RAID6 volume fails during rebuild period)*[P(a third disk within the degraded RAID6 volume fails during rebuild period)+P(encountering URE on a third disk within the degraded RAID6 volume during rebuild)]

The parameters described above can be incorporated into the ADLER statements for the example RAID levels. The parameter notation defined above is annotated with "1", "5", "MM", and "6" for RAID 1, 5, double mirror, and 6, respectively. For example, disk capacity C for a disk in a RAID1 array is denoted C1. Also, an additional probability, Pu, representing the probability of encountering at least one unrecoverable segment error during rebuild, is defined. The value of Pu is discussed below.

RAID1 ADLER (Events/Year per array)~8760*(N1/MTBF)*{[(G1−1)* C1/(ER1*MTBF)]+Pu1}

RAID5 ADLER (Events/Year per array)~8760*(N5/MTBF)*{[(G5−1)* C5/(ER5*MTBF)]+Pu5}

RAID1MM ADLER (Events/Year per array)~8760*(N1MM/MTBF)* [(G1MM−1)*C1MM/(ER1MM*MTBF)]*{[(G1MM−2)*C1MM/(ER1MM*MTBF)]+Pu1MM}

RAID6 ADLER (Events/Year per array)~8760*(N6/MTBF)*[(G6−1)* C6/(ER6*MTBF)]*{[(G6−2)C6/(ER6*MTBF)]+Pu6}

The factor "8760" in the above equations converts the results from per hour to per year. The following notation is used in the derivation of Pu:

Psc: Probability of unrecoverable error on a segment when the rebuild process attempts to read the segment while the system is in "critical mode" of operation (e.g., a disk has failed and the RAID volume needs to be rebuilt).

Pw: Probability that a segment-write operation results in unrecoverable segment error.

Pseg: Probability of unrecoverable segment error according to data sheet specification.

Pbit: Data sheet bit error rate specification.

Ps: Probability of unrecoverable error on a given segment at an arbitrary point in time.

Sseg: Size of a segment in bytes.

TS: Time cycle for a Scrub operation.

rw: ratio of writes to the sum of reads and writes.

h: rate at which a disk segment is read/written (e.g., a measure of load).

The probability of encountering at least one unrecoverable segment error during rebuild, Pu, can be defined as follows:

$$Pu=1-(1-Psc)^S$$

$$Psc=Pw-(Pw-Ps)*ln[(1+q)/q], \text{ where } q>=0, q=rw*h*C/ER$$

$$Pw=Pseg=Pbit*8*Sseg$$

$$Ps=(1-(1-e^{-hTS})/hTS)**rw*Pseg$$

where "ln" denotes a natural logarithm operation, "e" is the constant base of the natural logarithm, and S represents the number of segments that need to be read back for the rebuild operation.

The above formula for Pu introduces complexity into the model 210 that can be removed by estimating Pu. For example, a Taylor series expansion can be used and the most significant terms in the result can be interpreted. This yields the following estimation:

$$Pu \sim (K-1)*C*Pseg*Ld*(rw/2)*[(1/ER)+(1/SR)]$$

The Pu estimation can be recombined with the RAID specific ADLER equations above to yield the following final RAID specific ADLER equations. The notation is further simplified with the following substitutions:

$$\rho = 1/ER$$

$$\lambda = 1/MTBF$$

$$\sigma = 1/SR$$

The RAID specific ADLER equations can be defined as:

$$RAID1\ ADLER \sim 8760*N1*\lambda*C1*[(G1-1)*\rho1*\lambda + (K1-1)*Pseg*Ld1*(rw1/2)*(\rho1+\sigma1)]$$

$$RAID5\ ADLER \sim 8760*N5*\lambda*C5*[(G5-1)*\rho5*\lambda + (K5-1)*Pseg*Ld5*(rw5/2)*(\rho5+\sigma5)]$$

$$RAID1MM\ ADLER \sim 8760*N1MM*\lambda*C1MM* (G1MM-1)*\rho1MM*\lambda*C1MM*[(G1MM-2) *\rho1MM*\lambda+(K1MM-1)*Pseg*Ld1MM* (rw1MM/2)*(\rho1MM+\sigma1MM)]$$

$$RAID6\ ADLER \sim 8760*N6*\lambda*C6*(G6-1)*\rho6*\lambda*C6* [(G6-2)*\rho6*\lambda+(K6-1)*Pseg*Ld6*(rw6/2)*(\rho6+\sigma6)]$$

Note the significance of the rebuild and scrub rates (ER and SR expressed through ρ and σ) in the calculations. An additional refinement of these equations recognizes correlated failure by replacing every occurrence of "ρ*λ" with "ρ*λ*α". Correlated failure refers to common cause failure where the occurrence of the first failure may trigger subsequent failures to occur faster in the system. This means that the second, third, and so on failures may occur at a higher rate.

At this point, there is a means of calculating the ADLER that results from a choice of rebuild and scrub rates given the rest of the configuration of a given RAID array or portion thereof. The relationship between rebuild and scrub rates can be solved for a given ADLER. Since there is only one equation with two unknowns, an additional policy must be used to choose actual scrub and rebuild values. In an example, one such policy is to try to minimize rebuild rate so long as the resulting scrub rate is not too high. The threshold representing "too high" can be chosen as the scrub rate that corresponds to a point of diminishing return on reducing rebuild rate. This can be done by taking a first derivative of the rebuild rate with respect to scrub rate and imposing a threshold on the derivative to find the point of diminishing return.

For example, in a RAID1 array, the above ADLER equation solved for ER is:

$$ER1 \sim [(8760*N1*\lambda*C1)*SR1*(G1-1)*\lambda+(K1-1) *Pseg*Ld1*(rw1/2)]/[(RAID1\ ADLER)*SR1 - 8760*N1*\lambda*C1*(K1-1)*Pseg*Ld1*(rw1/2)]$$

Figure 4:
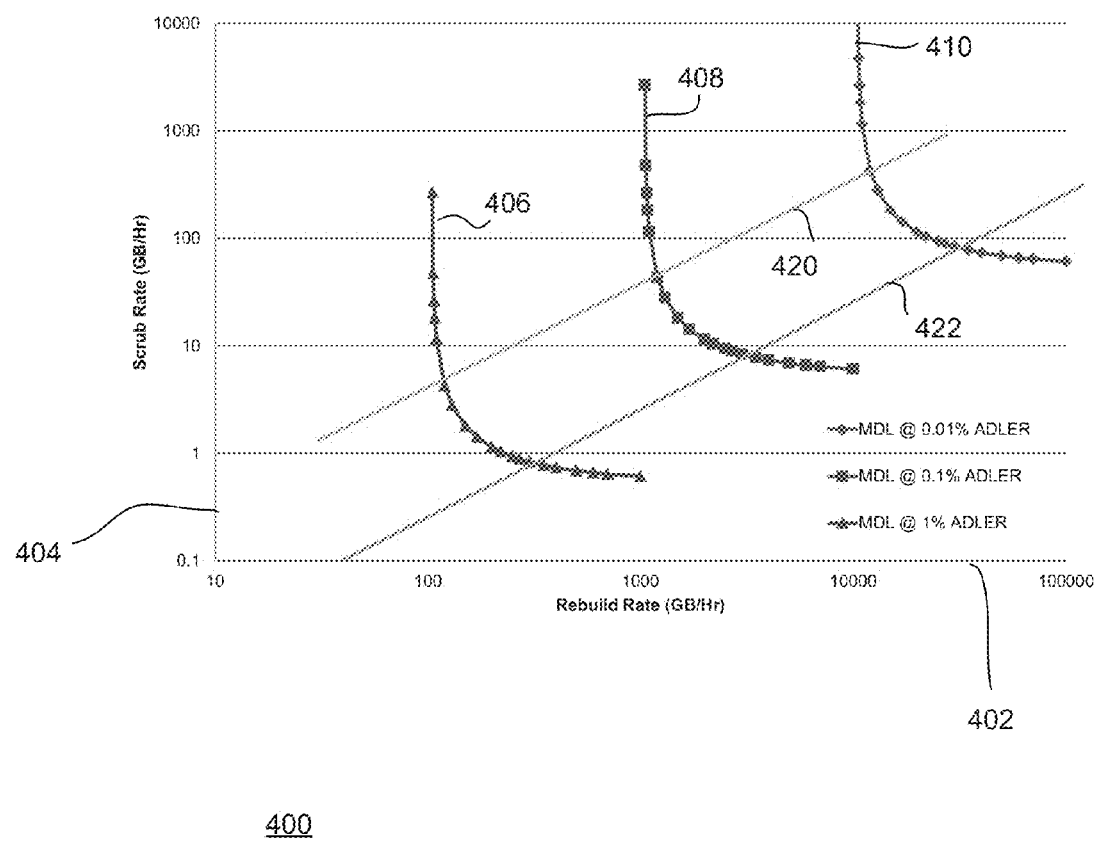
FIG. 4 shows a chart of scrub versus rebuild rates for a RAID5 volume according to an example implementation.

The relationship between ER and SR for a fixed ADLER has the form of y=ax/(x+b), a shape illustrated in FIG. 4. This shape applies to RAID1 and RAID5. In RAID6 and double mirroring, one of the ER terms is squared. Thus, in RAID6 and RAID1MM, the shape of the curve is more complex. However, a slope threshold can still be chosen using the technique described above. This technique is based on a line of constant ADLER. In practice, values of ER and SR that yield points in the region above and to the right of the constant ADLER curve are acceptable.

FIG. 4 shows a chart 400 of scrub versus rebuild rates for a RAID5 volume according to an example implementation. The chart 400 includes an x-axis 402 representing rebuild rate in GB/Hour, and a y-axis 404 representing scrub rate in GB/Hour. A curve 406 represents rebuild vs. scrub rate for a 1% ADLER. A curve 408 represents rebuild vs. scrub rate for a 0.1% ADLER. A curve 410 represents rebuild vs. scrub rate for a 0.01% ADLER. Lines 420 and 422 frame the region of the graph where scrub rate and rebuild rate influence each other given a constant ADLER. The region between the lines 420 and 422 illustrates an "active region" of the rebuild v. scrub rate tradeoff.

This process can be repeated for each RAID mode. One of the implications of this approach is that rebuild rates and/or scrub rates for parts of the system that are more vulnerable will be higher than parts of the system that are less vulnerable. It is also good practice to rebuild more vulnerable parts of the system first when multiple parts are degraded. Finally, the model 210 can be enhanced to allow higher scrub and/or rebuild rates when input/output activity from other sources is low (e.g., below a defined threshold). The model 210 can then be used to insure that average scrub and rebuild rates do not fall below acceptable values when other input/output activity is more intense.

FIG. 5 is a flow diagram depicting a method 500 of optimizing a RAID volume according to an example implementation. The method 500 can be performed by the controller 104 shown in FIG. 1 to determine optimal rebuild and scrub rates for any given RAID volume. The method 500 begins at step 502, where a RAID level is identified for disks in the RAID volume. At step 504, a relation is defined among rebuild rate, scrub rate, and ADLER for the RAID volume using various constant values and the RAID level. Examples of various constant parameters are described above with respect to FIG. 3. At step 506, a value for ADLER is selected. At step 508, a policy is applied to the relation to choose a value for the rebuild rate or the scrub rate. In an example, a threshold is applied to a derivative of the relation with respect to the rebuild rate or the scrub rate. At step 508, a value for the other of the rebuild rate or the scrub rate is determined from the relation using the value of the rebuild rate or the scrub rate as determined by the policy. In this manner, optimal rebuild and scrub rates can be selected for the RAID volume.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of optimizing a redundant array of independent disks (RAID) volume, comprising:
   identifying a RAID level used for a plurality of disks in the RAID volume;
   defining a relation among rebuild rate, scrub rate, and annualized data loss event rate (ADLER) for the RAID volume using constant values and the RAID level;
   selecting a value for the ADLER;
   applying a policy to the relation to choose a value for one of the rebuild rate or the scrub rate; and determining a value for the other of the rebuild rate or the scrub rate from the relation using the value of the rebuild rate or the scrub rate as determined from the policy.

2. The method of claim 1, wherein the constant values in the relation are selected from at least one of design-controlled parameters, supplier-controlled parameters, operation-controlled variables, or usage-controlled-variables.

3. The method of claim 2, wherein the design-controlled parameters include at least one of RAID geometry or RAID fault domain, wherein the supplier-controlled parameters include at least one of disk failure rate or unrecoverable read error specification, and wherein the usage-controlled-variables include at least one of disk capacity, number of disks, load, or type of load.

4. The method of claim 1, wherein the RAID level is one of RAID1 or RAID5, and wherein the relation is such that the ADLER is determined from a product of the probability any disk fails within the RAID volume per year and a sum of the probability any disk within the RAID volume as degraded fails during a rebuild period and the probability of encountering at least one unrecoverable error on any disk within the RAID volume as degraded during the rebuild period.

5. The method of claim 1, wherein the RAID level is one of RAID1MM or RAID6, and wherein the relation is such that the ADLER is determined from the probability any disk fails within the RAID volume per year times the probability any disk within the RAID volume as degraded fails during a rebuild period times a sum of the probability another disk fails within the RAID volume as degraded during the rebuild period and the probability of encountering at least one unrecoverable error on the other disk within the RAID volume as degraded during the rebuild period.

6. The method of claim 1, wherein the step of applying a policy comprises applying a threshold to a derivative of the relation with respect to the rebuild rate or the scrub rate.

7. An apparatus for optimizing a redundant array of independent disks (RAID) volume, comprising:
  an input/output (IO) interface coupled to a plurality of disks comprising the RAID volume; and
  a processor, coupled to the IO interface, to define a relation among rebuild rate, scrub rate, and annualized data loss event rate (ADLER) for the RAID volume using constant values and a RAID level, select a value for the ADLER, apply a policy to the relation to choose a value for one of the rebuild rate or the scrub rate, and determine a value for the other of the rebuild rate or the scrub rate from the relation using the value of the rebuild rate or the scrub rate as determined by the policy.

8. The apparatus of claim 7, wherein the constant values in the relation are selected from at least one of design-controlled parameters, supplier-controlled parameters, operation-controlled parameters, or usage-controlled-variables.

9. The apparatus of claim 8, wherein the design-controlled parameters include at least one of RAID geometry or RAID fault domain, wherein the supplier-controlled parameters include at least one of disk failure rate or unrecoverable read error specification, and wherein the usage-controlled-variables include at least one of disk capacity, number of disks, load, or type of load.

10. The apparatus of claim 7, wherein the RAID level is one of RAID1 or RAID5, and wherein the relation is such that the ADLER is determined from a product of the probability any disk fails within the RAID volume per year and a sum of the probability any disk within the RAID volume as degraded fails during a rebuild period and the probability of encountering at least one unrecoverable error on any disk within the RAID volume as degraded during the rebuild period.

11. The apparatus of claim 7, wherein the RAID level is one of RAID1MM or RAID6, and wherein the relation is such that the ADLER is determined from the probability any disk fails within the RAID volume per year times the probability any disk within the RAID volume as degraded fails during a rebuild period times a sum of the probability another disk fails within the RAID volume as degraded during the rebuild period and the probability of encountering at least one unrecoverable error on the other disk within the RAID volume as degraded during the rebuild period.

12. The apparatus of claim 7, wherein applying a policy comprises applying a threshold to a derivative of the relation with respect to the rebuild rate or the scrub rate.

13. A computer readable storage medium having stored thereon instructions that when executed by a processor cause the processor to perform a method of optimizing a redundant array of independent disks (RAID) volume, comprising:
  identifying a RAID level used for a plurality of disks in the RAID volume;
  defining a relation among rebuild rate, scrub rate, and annualized data loss event rate (ADLER) for the RAID volume using constant values and the RAID level;
  selecting a value for the ADLER;
  applying a policy to the relation to choose a value for one of the rebuild rate or the scrub rate; and
  determining a value for the other of the rebuild rate or the scrub rate from the relation using the value of the rebuild rate or the scrub rate as determined by the policy.

14. The computer readable storage medium of claim 13, wherein the RAID level is one of RAID1 or RAID5, and wherein the relation is such that the ADLER is determined from a product of the probability any disk fails within the RAID volume per year and a sum of the probability any disk within the RAID volume as degraded fails during a rebuild period and the probability of encountering at least one unrecoverable error on any disk within the RAID volume as degraded during the rebuild period.

15. The computer readable storage medium of claim 13, wherein the RAID level is one of RAID1MM or RAID6, and wherein the relation is such that the ADLER is determined from the probability any disk fails within the RAID volume per year times the probability any disk within the RAID volume as degraded fails during a rebuild period times a sum of the probability another disk fails within the RAID volume as degraded during the rebuild period and the probability of encountering at least one unrecoverable error on the other disk within the RAID volume as degraded during the rebuild period.

* * * * *